Feb. 17, 1970    J. A. AILEO    3,495,273
SAFETY HELMET WITH RETRACTABLE EYE SHIELD
Filed Jan. 17, 1967    8 Sheets-Sheet 1

INVENTOR.
JACKSON A. AILEO
BY Lester N. Clark
ATTORNEY

Feb. 17, 1970   J. A. AILEO   3,495,273
SAFETY HELMET WITH RETRACTABLE EYE SHIELD
Filed Jan. 17, 1967   8 Sheets-Sheet 2

INVENTOR.
JACKSON A. AILEO
BY Lester W. Clark
ATTORNEY

Feb. 17, 1970  J. A. AILEO  3,495,273
SAFETY HELMET WITH RETRACTABLE EYE SHIELD
Filed Jan. 17, 1967  8 Sheets-Sheet 5

INVENTOR.
JACKSON A. AILEO
BY Lester N. Clark
ATTORNEY

Feb. 17, 1970 — J. A. AILEO — 3,495,273
SAFETY HELMET WITH RETRACTABLE EYE SHIELD
Filed Jan. 17, 1967 — 8 Sheets-Sheet 7

INVENTOR.
JACKSON A. AILEO
BY Lester W. Clark
ATTORNEY

Feb. 17, 1970   J. A. AILEO   3,495,273
SAFETY HELMET WITH RETRACTABLE EYE SHIELD
Filed Jan. 17, 1967   8 Sheets-Sheet 8

INVENTOR.
JACKSON A. AILEO
BY Lester W. Clark
ATTORNEY

United States Patent Office 3,495,273
Patented Feb. 17, 1970

3,495,273
SAFETY HELMET WITH RETRACTABLE EYE SHIELD
Jackson A. Aileo, Carbondale, Pa., assignor, by mesne assignments, to Gentex Corporation, Carbondale, Pa., a corporation of Delaware
Filed Jan. 17, 1967, Ser. No. 609,827
Int. Cl. A42b 3/00; A61f 9/04
U.S. Cl. 2—6       11 Claims

ABSTRACT OF THE DISCLOSURE

A safety helmet including a shell to cover the wearer's head, and one or two eye shields mounted on the shell and movable between eye shielding positions and retracted positions. Handles for actuating the shields are located at the sides of the helmet. Releasable locking mechanisms for the shields include push buttons on the handles for releasing the locks. Fixed stops may be mounted to engage the handles to prevent movement of the eye shields past a given point, the handles being releasable from the stops by depression of the push buttons to permit such motion.

CROSS REFERENCES TO RELATED PATENTS AND APPLICATION

The invention disclosed herein is related to the inventions disclosed in the patents to Finken, No. 2,815,508 and Aileo, Nos. 3,066,305, 3,110,034 and 3,237,202, and in the copending application of Jackson A. Aileo, applicant herein, Ser. No. 560,575, filed June 27, 1966, now Patent No. 3,400,407.

BACKGROUND OF THE INVENTION

This invention relates to safety helmets and is particularly concerned with safety helmets having eye shields which are movable between a shielding position in front of the wearer's eyes and a retracted position, commonly above the wearer's forehead.

In the prior art, such eye shields have been manipulated between their two positions either by manually grasping the eye shield directly, as in the Finken Patent No. 2,815,508 or by grasping an operating knob located at the middle of the helmet. Both of these manipulations involve the possibility of getting the hand or arm of the wearer into the field of vision, thereby blocking, at least partially, the wearer's view. In many occupations where such helmets are used, for example, the case of the pilot of a jet aircraft, this partial blocking of the field of view can be very hazardous, even though the view is blocked for a very short time. Moreover, a centrally disposed operating knob projects above the helmet at least when the eye shield is in retracted position. In aircraft having limited clearance between the pilot's head and an overhanging canopy of plastic or the like, such upwardly projecting structure on the pilot's helmet is undesirable as it may tend to strike or scratch the canopy.

Apart from the foregoing considerations, stated generally it is desirable that a helmet with retractable eye shield, however constructed, be arranged to enable movement of the eye shield with manipulative ease and at the same time to provide for retention of the eye shield in any of a plurality of positions. It is also often desired that the eye shield be readily removable and replaceable without disassembly of the structure supporting it on the helmet. In some cases, provision of a double eye shield is advantageous, for example to permit the wearer to select a clear or tinted shield, depending on conditions of illumination. Again, it is frequently desired to provide an external cover or housing to protect the eye shield when in retracted position; and in such helmets, it is desirable to avoid aerodynamic effects which might tend to lift or move the eye shield cover.

Elimination of downward or upward movement of the eye shield, especially when the shield is approaching or at its lower, shielding position, is also sometimes desired. For example, it may be advantageous to arrest downward motion of the shield at a predetermined locality selected to position the shield in proper and comfortable relation to the wearer's nose. Locking of the shield against upward movement from shielding position is desirable to prevent lifting of the shield owing to air blast effects.

The state of the art may be exemplified by brief reference to the patents and application cited above. Aileo Patent No. 3,066,305 shows eye shield operating mechanism wherein a spring element connected to the eye shield and having a camming surface is moved along a fixed corrugated strip in camming engagement with the corrugations of the strip to hold the eye shield in any of a plurality of positions. In Aileo Patent No. 3,237,202, there are shown arrangements for operating an eye shield in which the manpulated handle is in the form of a knob which is rotated to release the eye shield from a locked position, that release being accomplished by a screw mechanism. Both of the last-mentioned Aileo patents, as also the pending application cited above, further shown arrangements in which the handle or knob is separable from the eye shield by turning of the handle relative to the eye shield, to facilitate removal and replacement of the shield.

It is also old in the art to release a locking mechanism for an eye shield by means of a push button located at the center of such a knob. In the Aileo application Ser. No. 560,575, there is described an eye shield knob having a camming surface spring biased into camming engagement with a fixed corrugated strip for holding the eye shield in fixed position relative to the strip and helmet. The biasing force is overcome to enable movement of the eye shield to other positions, by depression of a push button carried by the knob.

In the Finken Patent No. 2,815,508, there is disclosed in FIG. 8 a helmet having two eye shields, one tinted and one clear, which may be selectively moved in front of the wearer's eyes.

Aileo Patent No. 3,110,034 shows a helmet having an eye shield retractable to a position inside a cover, in which the cover is provided with vents along its rearward edge to minimize undesirable aerodynamic effects.

SUMMARY OF THE INVENTION

The present invention contemplates the operation of an eye shield between its shielding and retracted positions by means of a handle located at the side of the helmet so that the wearer can readily grasp it without partially blocking his view. In one modification of the invention a single eye shield is provided with operating handles at both sides of the helmet. In other modifications of the invention, two eye shields are provided, one clear and one tinted, and separate handles are provided for operating the respective eye shields, the handles being located on opposite sides of the helmet.

In one modification, the shield is releasably lockable in any of a plurality of positions. Since a screw type of releasing mechanism might confuse the wearer where the two handles are located at the opposite sides of the helmet, the shield releasing mechanism associated with the handle has been provided with a release actuated by a push button located centrally of the knob-shaped handle. The pushing of a button is intuitively the same operation at either side of the helmet, and thus introduces no confusion. Where the wearer is required to turn a knob to operate a screw actuated release, he might turn the knob in the wrong direction, especially where there are two such knobs on opposite sides of the helmet, which are turned in opposite directions to release their respective eye shield locking mechanisms.

In the latter modification, each handle may be located on a housing aligned with one of the rearward vents in the cover. The housing has a slot in which the handle moves, and which also serves to improve the venting effect of Patent No. 3,110,034.

Further, each handle may be connected to its associated eye shield by a link extending through the housing. The link pivots freely about its connection to the eye shield to permit sufficient relative angular movement of these elements to enable the handle to move along a straight path while the eye shield moves along a curved path. The connection between the handle and link may be such as to enable separation of the link from the handle by turning of the handle, for removal of the eye shield from the helmet. After such removal, the link-connected to the eye shield but freely pivoted thereon—may be turned into a position in which it extends parallel to the top edge of the shield, to facilitate storage thereof. Also, the eye shield may readily be reassembled with the handle and helmet by manually guiding the link into the housing for reconnection to the handle.

The shield-locking and releasing mechanism may be generally similar to that described in the aforementioned copending Aileo application Ser. No. 560,575, and thus may comprise a camming surface carried by the eye shield handle and biased by a spring into camming engagement with a corrugated strip fixed in position on the housing in parallel adjacent relation to the housing slot. Depression of the push button overcomes the basing force of the spring and moves the camming surface away from the corrugated strip to enable free movement of the eye shield.

With such mechanism, a stop may be positioned in the path of the handle to arrest motion of the eye shield in either or both upward and downward directions at a given point in such path—for example, to limit downward motion at a shielding position selected with regard to the individual wearer's comfort, or to prevent accidental upward movement from shielding position owing to air blast effects. The handle portion engaged by the stop is biased into such engagement by the spring that acts on the handle camming surface and is displaceable out of such engagement (to enable movement of the eye shield beyond the stop locality) by depression of the push button.

In an alternative modification, facing corrugations are provided on the opposed side surfaces of the housing slot, and the handle bears a pair of pivoted dogs projecting through the slot and spring biased outwardly into engagement with the corrugations at the respective sides thereof to lock the eye shield in position. To overcome the biasing force, the dogs are pinched together, and the handle and eye shield are then movable to other positions.

DESCRIPTION OF THE PREFERRED EMBODIMENTS

FIGS. 1-8

Figure 1:
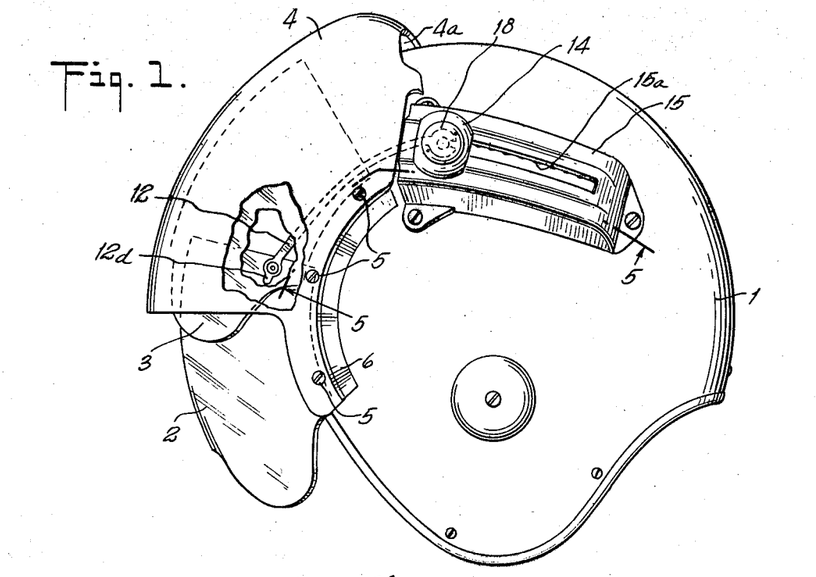
FIG. 1 is a side elevational view of a helmet having two eye shields and embodying one modification of the invention. Certain parts of the drawing are broken away.
Figure 2:
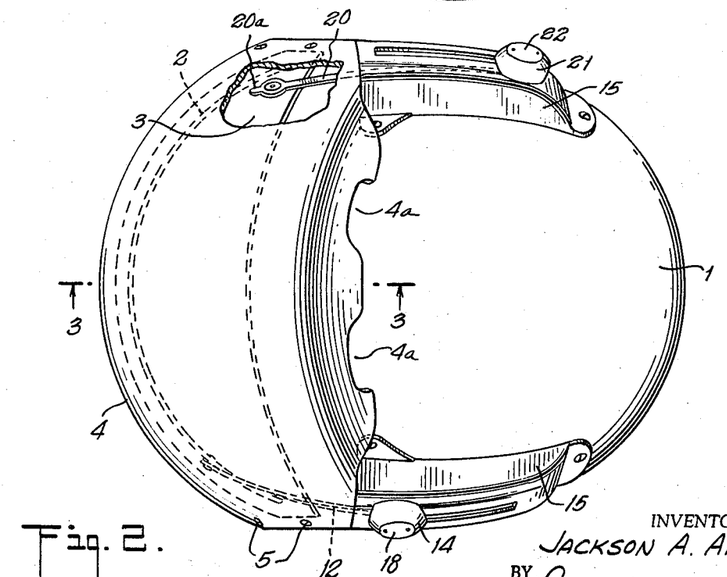
FIG. 2 is a plan view of the helmet of FIG. 1, with parts of the drawing broken away.
Figures 3, 4, 4A:
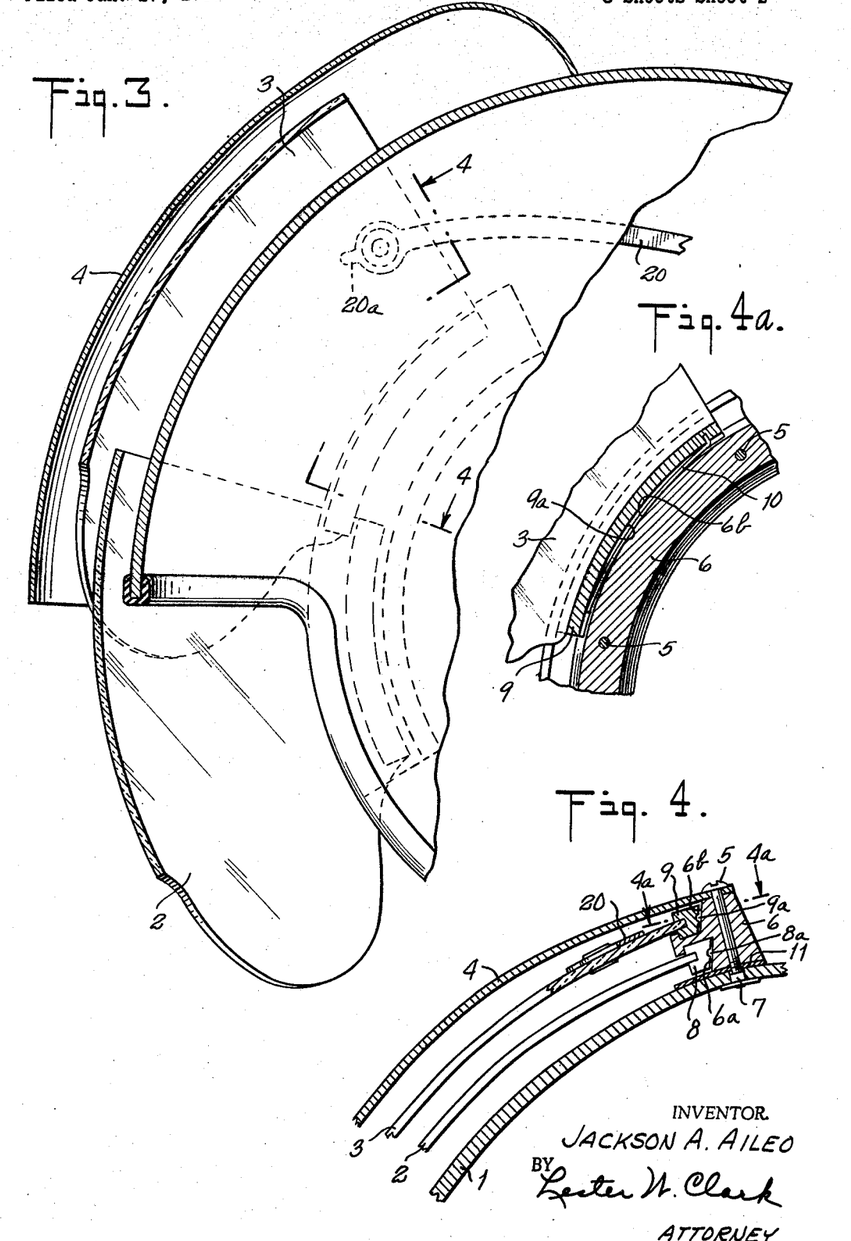
FIG. 3 is a fragmentary sectional view taken on the line 3—3 of FIG. 2.
FIG. 4 is a fragmentary sectional view taken on the line 4—4 of FIG. 3.
FIG. 4a is a fragmentary sectional view, taken on the line 4a—4a of FIG. 4.

There is disclosed in these figures a helmet including a shell 1 adapted to be mounted by an internal rigging (not shown) of conventional form, upon the head of a wearer and provided with two eye shields 2 and 3. Each of the two eye shields is adapted to move between an eye shielding position in which it is located in front of the wearer's eye, as shown in the case of the eye shield 2 in FIGS. 1 and 3, and a retracted position in which it is located above the forward part of the shell 1, as shown in the case of the eye shield 3 in FIGS. 1 and 3. Both of the eye shields 2 and 3 are covered, when in their retracted positions, by a cover 4 attached at its edges by means of screws 5 to a mounting strip 6. The screws 5 extend through the mounting strips 6 and cooperate with nuts 7 inside the shell 1, as best seen in FIG. 4. The two mounting strips 6 are provided on their inner surface, i.e., the surface enclosed within the cover 4, with a pair of recesses defining arcuate inner and outer ways, 6a and 6b. Along each lateral edge of each of the eye shields 2 and 3, there is affixed a bead 8, 9 whose contours respectively conform to the ways 6a and 6b. The beads 8 and 9 are provided with grooves 8a and 9a along their outer edges. Each groove receives a spring wire 10 (FIG. 4a) mounted on the bead and self-biased against the associated way to provide sufficient sliding friction to hold the eye shield snugly in place without vibration or rattling. Each of the strips 6 rests upon a plate 11, which is clamped between the strip 6 and the shell 1.

Figures 5, 5A, 6, 7:
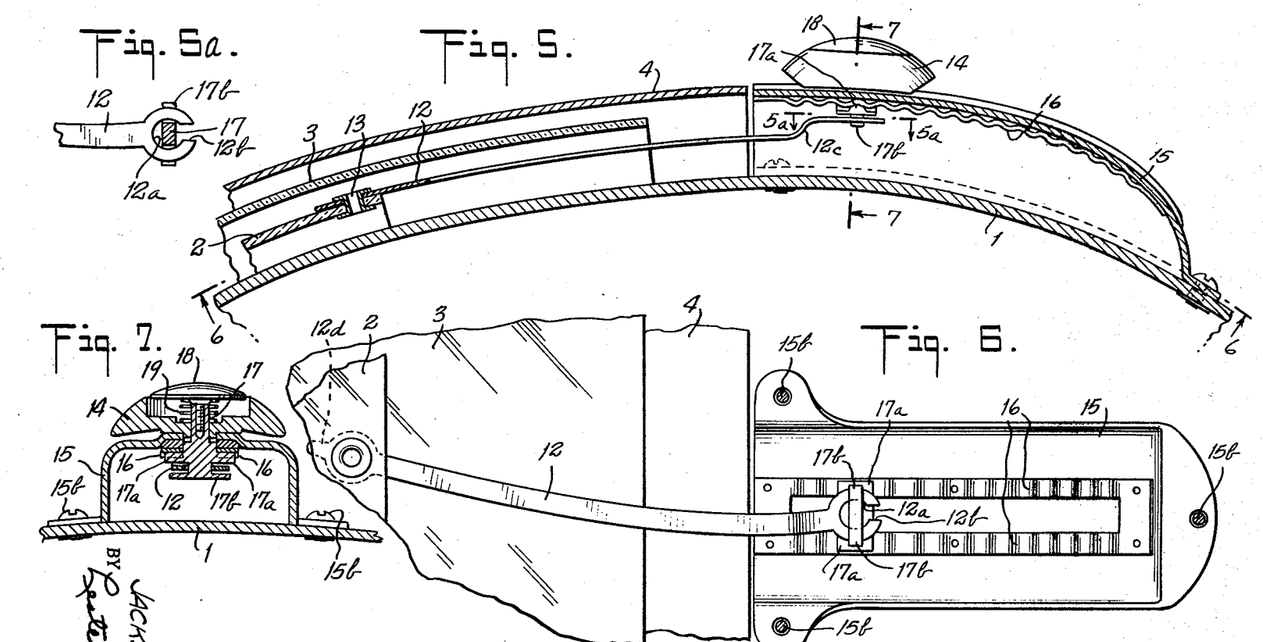
FIG. 5 is a fragmentary sectional view, on an enlarged scale, taken on the line 5—5 of FIG. 1, showing the operating mechanism for one of the two eye shields.
FIG. 5a is a fragmentary sectional view, taken on the line 5a—5a of FIG. 5.
FIG. 6 is a bottom plan view of the eye shield operating mechanism shown in FIG. 5, taken on the line 6—6 of FIG. 5.
FIG. 7 is a sectional view taken on the line 7—7 of FIG. 5.

The eye shield 2 is pivotally connected near its upper left-hand corner to a link 12 by means of an eyelet 13. Link 12 overlies the outer surface of eye shield 2 and pivots freely (on the eyelet 13) through a full 360° relative to the shield. As best seen in FIG. 5, the link 12 extends upwardly and rearwardly from the eye shield 2 and is pivotally connected at its opposite end to a knob-shaped actuating handle 14. The mechanism of the handle 14 is shown in detail in FIG. 7. A housing 15 for the actuating mechanism is mounted on the outside of the shell 1 by means of screws 15b. The housing 15 has a rectilinear slot 15a running along its center and extending rearwardly from a position near the top of the eye shield cover 4. On the under side of the housing 15, and on either side of the slot 15a, there are mounted a pair of corrugated springs 16.

The handle 14 is provided with a square aperture at its center to slidably receive a square post 17 (see FIG. 7) which extends through the slot 15a and is formed at the under side of that slot with a pair of laterally projecting teeth 17a adapted to engage the corrugations in the springs 16. The lower end of the post 17 has another pair of lateral teeth 17b. The post 17 is of oblong cross section between the pairs of teeth 17a and 17b. The end of the link 12 at the post 17 is slotted at 12b to provide a forked end opening into a circular aperture 12a. The oblong section of post 17 may be inserted through the narrow slot 12b and then rotated through 90° in the aperture 12a, so that the post can then not pass out through the slot 12b without further rotation. A button 18 is provided at the center of the handle 14. The under side of the button 18 has a threaded projection received in a corresponding threaded recess in the post 17. The button 18 is normally tightly threaded into the post 17 so that button 18 and post 17 move together. A coil spring 19 encircles the post 17 and is compressed between the bottom of a recess in the handle 14 and the under side of the button 18. The spring 19 biases the button 18 outwardly and thereby biases the projecting teeth 17a into engagement with the corrugations in the springs 16.

The link 12 is provided with a step 12c near its uppermost end, to provide clearance for the outermost eye shield 3. Step 12c, however, is sufficiently limited in extent to permit the link, while attached to shield 2, to pass with clearance between shell 1 and cover 4 when the shield is removed from the helmet.

To operate the shield 2 between its eye shielding position and its retracted position, the wearer depresses the button 18, thereby releasing the handle 14 so that it is free to move along the slot 15a. The wearer may then set the eye shield in any desired new position and release the button 14, whereupon the eye shield is locked in the nearest adjacent recess of the springs 16 in which the teeth 17a fit.

Although the edge of eye shield 2 to which link 12 is connected moves along an arcuate path, the free pivotal action of the link about eyelet 13 together with the pivotal action of the link about post 17 permits such relative angular displacement of these elements as to accommodate rectilinear movement of the handle in correspondence with the arcuate movement of the eye shield. Thus slot 15a may be rectilinear, as shown, facilitating fabrication and assembly of the corrugated springs 16 and assuring the desired cooperation of the handle structure therewith to hold the eye shield in any selected position.

Figure 8:
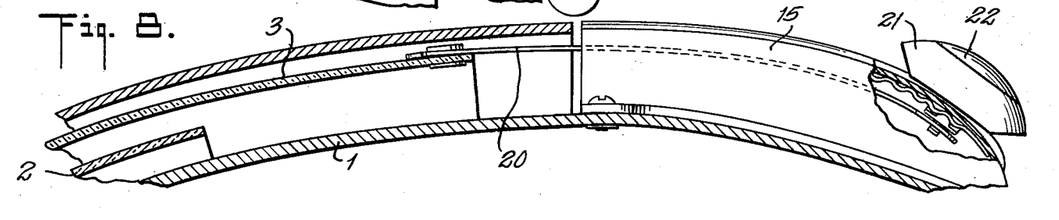
FIG. 8 is a view similar to FIG. 5, but showing the operating mechanism for the other eye shield located on the opposite side of the helmet.
Figure 9:
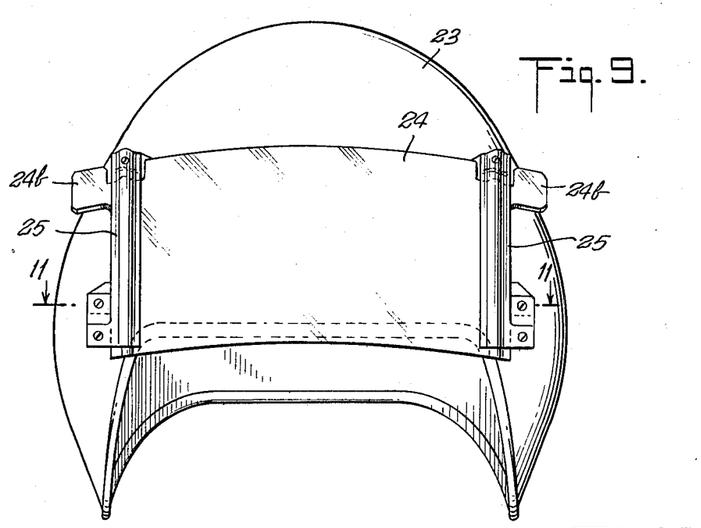
FIG. 9 shows a front elevational view of a helmet having a single eye shield and incorporating another modification of the invention.
Figure 10:
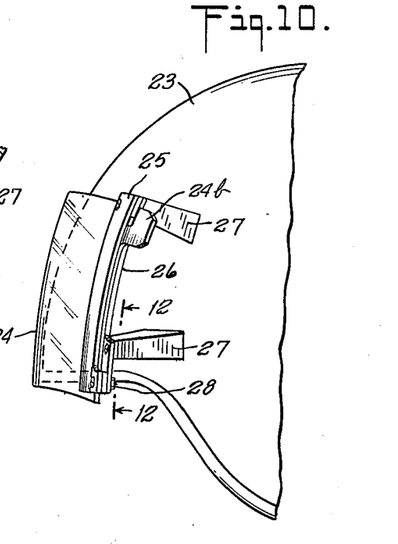
FIG. 10 is a fragmentary side view of the helmet of FIG. 9.
Figures 11, 12, 13:
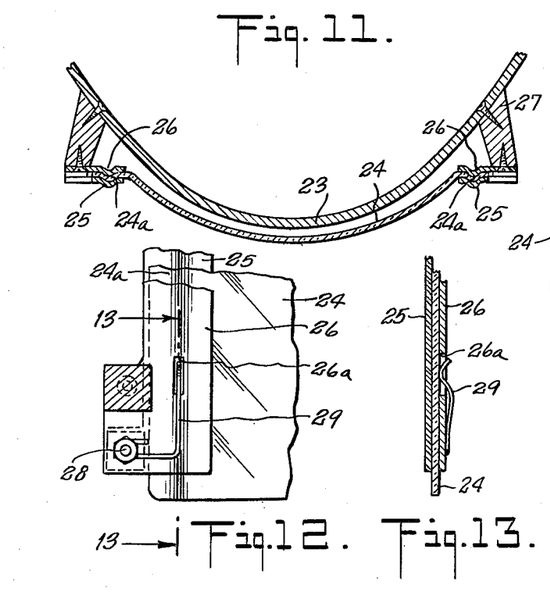
FIG. 11 is a sectional view taken on the line 11—11 of FIG. 9.
FIG. 12 is a sectional view taken on the line 12—12 of FIG. 10.
FIG. 13 is a sectional view taken on the line 13—13 of FIG. 12.

The eye shield 3 is provided with a similar actuating mechanism including a link 20, a handle 21 and a pushbutton 22, as shown in FIG. 8. The construction and operation is the same as that for the actuating mechanism of eye shield 2 except that the link 20 does not have a step corresponding to the step 12c in the link 12. The reason for this is simply that the eye shield 3 is located at a greater distance from the helmet shell 1 than the eye shield 2, whereas the handle 21 and its related parts are located at the same distance from the shell 1 as the handle 14.

The described link and handle construction enables easy removal and replacement of the eye shields without disassembly of the cover 4 and housings 15. Ordinarily the handles 14 and 21 are prevented from rotation in their respective slots by interference between the edges of the slots and the square handle portions projecting therethrough. However, when the post 17 of handle 14 and the corresponding post of handle 21 are released by unscrewing their associated pushbuttons, the posts may be rotated 90° to permit disengagement of the links 12 and 20 therefrom, and the eye shields 2 and 3 may then be drawn manually downward, out of the cover 2, to free them from the helmet. After such removal, the links (being still pivotally connected to the eye shields) may be rotated into positions overlying and parallel to the upper edges of the eye shields, to minimize space requirements for storage of the shields.

For reassembly of the eye shields with the helmet, the shield 2 is advanced manually into position beneath the cover 4, with the beads on the side edges of the shield inserted in their respective ways. The pivoted link 12 is guided manually into the housing 15 for re-engagement with post 17 of handle 14. To assist in such guiding, a tab 12d projects from the lower edge of the link adjacent the eyelet 13; as the upper edge of the eye shield is advanced beneath the cover 4 and the tab 12d remains accessible to the fingers for final guiding and positioning of the link. Post 17 is then brought into engagement with the slotted upper link end 12b within slot 15 and rotated 90° so as to hold the link; thereafter the handle 14 is reassembled in position. The same procedure is followed for reassembly of the shield 3; as shown, link 29 pivoted on the latter eye shield also bears a downwardly projecting tab 20a to facilitate guiding of the link into position.

The cover 4 is provided along its upper edge with a row of vents 4a, for a purpose described in detail in Aileo Patent No. 3,110,034. In the arrangement shown, two of these vents not only serve that aerodynamic purpose, but also provide ready passage for the links 12 and 20 through the upper edge of the cover. Furthermore, the slots 15a in the housings 15 are effective to improve the venting effect of the vents 4a, for equalization of pressure within and outside the eye shield cover 4. That is to say, these slots 15a cooperate with the two vents 4a immediately ahead of the housings to provide a continuous passage for air flow between the interior of the cover 4 and the exterior.

The assembly of the eye shields and their actuating mechanisms is facilitated by making the housings 15 separate from the cover 4. Thus, where the housings 15 are separate, the assembler can turn his attention successively to (1) the cover 4 and eye shields 2, 3 and related parts; (2) one housing 15 and its related handle assembly; and (3) the other housing 15 and its related handle assembly. While working on any one phase of the assembly, the assembler does not have to worry about the other two phases.

It may be seen that each of the two eye shields 2 and 3 may be actuated by manipulation of a handle 14 or 21, located at one side of the helmet and that it is not necessary for the wearer to extend his hand or arm in front of the eye shield in order to move it. Furthermore, the releasing manipulation required for each of the handles 14 and 21 is exactly the same and not readily confused, namely, the pushing of a button at the center of the handle. Since the handles 14 ad 21 are located at the sides of the helmet, there is no structure projecting above the helmet such as might tend to strike or scratch an aircraft canopy above the wearer's head.

FIGS. 9–13

These figures illustrates a helment 23 provided with an eye shield 24 of somewhat simpler structure than the eye shields 2 and 3 of FIGS. 1 to 8. The eye shield 24 is provided near its lateral edges with forwardly projecting ribs 24a which ride in ways formed by a pair of parallel strips 25 and 26. The strips are mounted on the helmet shell 23 by means of posts 27, to which they are attached by screws or the like. From each side of the eye shield 24, near its upper end, there projects one of a pair of handles 24b, which are integral with the eye shield and extend out between the parallel strips 25, 26. Attached to the lower end of the strip 26 by means of a screw 28 is a spring finger 29 whose upper end is bent over and extends through an aperture 26a in the strip 26 so that it frictionally engages the edge of the eye shield 24, so as to hold it in any position to which it may be manipulated through the use of the handles 24b. This spring friction arrangement is similar to that shown in Finken Patent 2,815,508.

As in the case of the helmet of FIGS. 1–8, it may be observed that the eye shield 24 can be manipulated without extending the arm or hand of the wearer into his field of vision, and that there is no upwardly projecting knob structure above the helmet.

Figure 14:
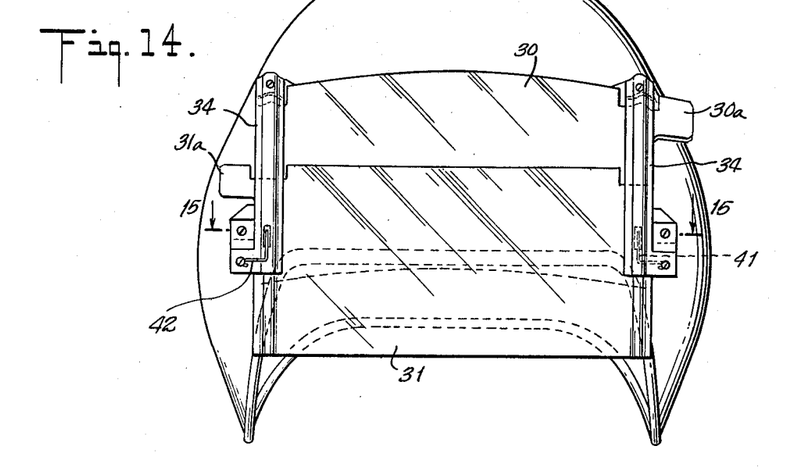
FIG. 14 is a front elevational view of another helmet embodying still another modification of the invention, and incorporating two eye shields.
Figure 15:
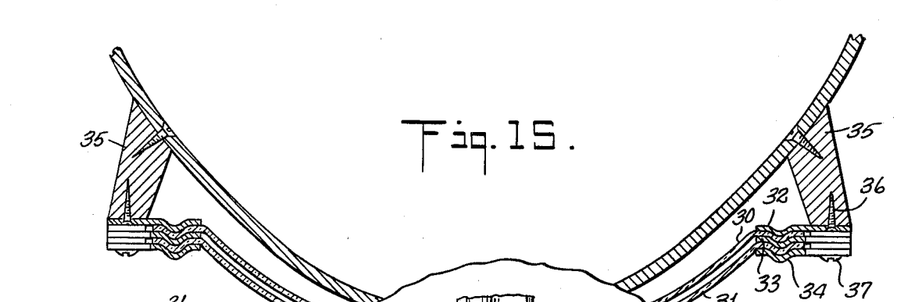
FIG. 15 is a view taken on the line 15—15 of FIG. 14.
Figure 16:
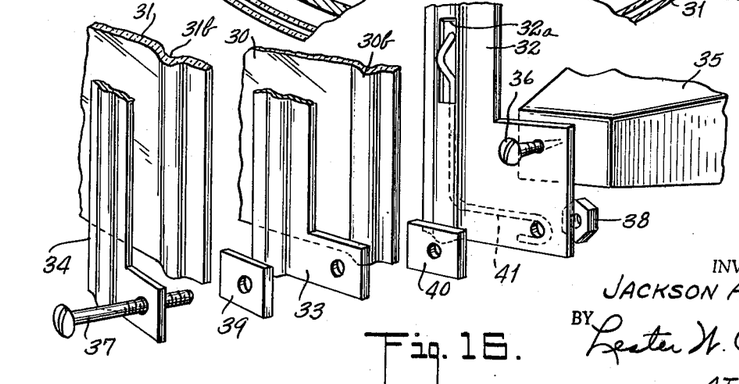
FIG. 16 is an exploded perspective view of an assembly of the eye shield guides and one of the friction springs in the helmet of FIG. 14.

FIGS. 14–16

These figures illustrate a modification of the eye shield arrangement of FIGS. 9–13 incorporating two eye shields 30 and 31, one of which may be clear and the other tinted. The eye shield 30 has an integral handle 30a at its upper right-hand corner, as viewed in FIG. 14. The shield 31 has an integral handle 31a at its upper left-hand corner, as viewed in FIG. 14.

The structure of the ways in which the shields 30 and 31 move is shown in detail in FIGS. 15 and 16. Each of the eye shields 30 and 31 is provided along its lateral margins with forwardly projecting ribs 30b and 31b. These ribs fit between correspondingly formed ribs in a stack of strips 32, 33 and 34. The ribs 30b on the eye shield 30 fits between the ribs on the strips 32 and 33. The rib 31b on the eye shield 31 fits between the ribs on the strips 33 and 34. The strips 32 are held in place on posts 35 by means of screws 36. The other strips 33 and 34 are mounted in a stack on the strip 32 by means of a cooperating screw 37 and a nut 38 and spacers 39 and 40. A spring finger 41, corresponding in structure and function to the spring finger 29 of FIGS. 9–13, is held in place by the screw 37 and nut 38 and has its end bent over to project through an aperture 32a formed in the strip 32. A similar spring finger 42 is located on the outside of the strip 34 at the opposite side of the helmet and provides a frictional grip on the eye shield 31. The spring finger 41 provides a frictional grip on the eye shield 30. Note that the spring fingers 41 and 42 are located at the same side of their associated eye shields as the handles for those eye shields, thereby minimizing any tendency for the eye shields to jam due to an angular movement thereof when a force is applied to the handles 30a and 31a.

Again, as in the case of the previously disclosed species, note that the handles 30a and 31a may be actuated by the wearer without extending his hand or arm in front of his field of vision, and that there is no central knob projecting above the helmet.

FIGS. 17–20

These figures illustrate a further modified embodiment of the invention including a helmet shell 45 having mounted thereon a pair of eye shields respectively designated 46 and 47 both movable between retracted and shielding positions. Both of these eye shields are covered, when in their retracted positions, by a cover 48 attached at its edges to the helmet shell by means of screws 49.

Figures 17, 18, 19, 20:
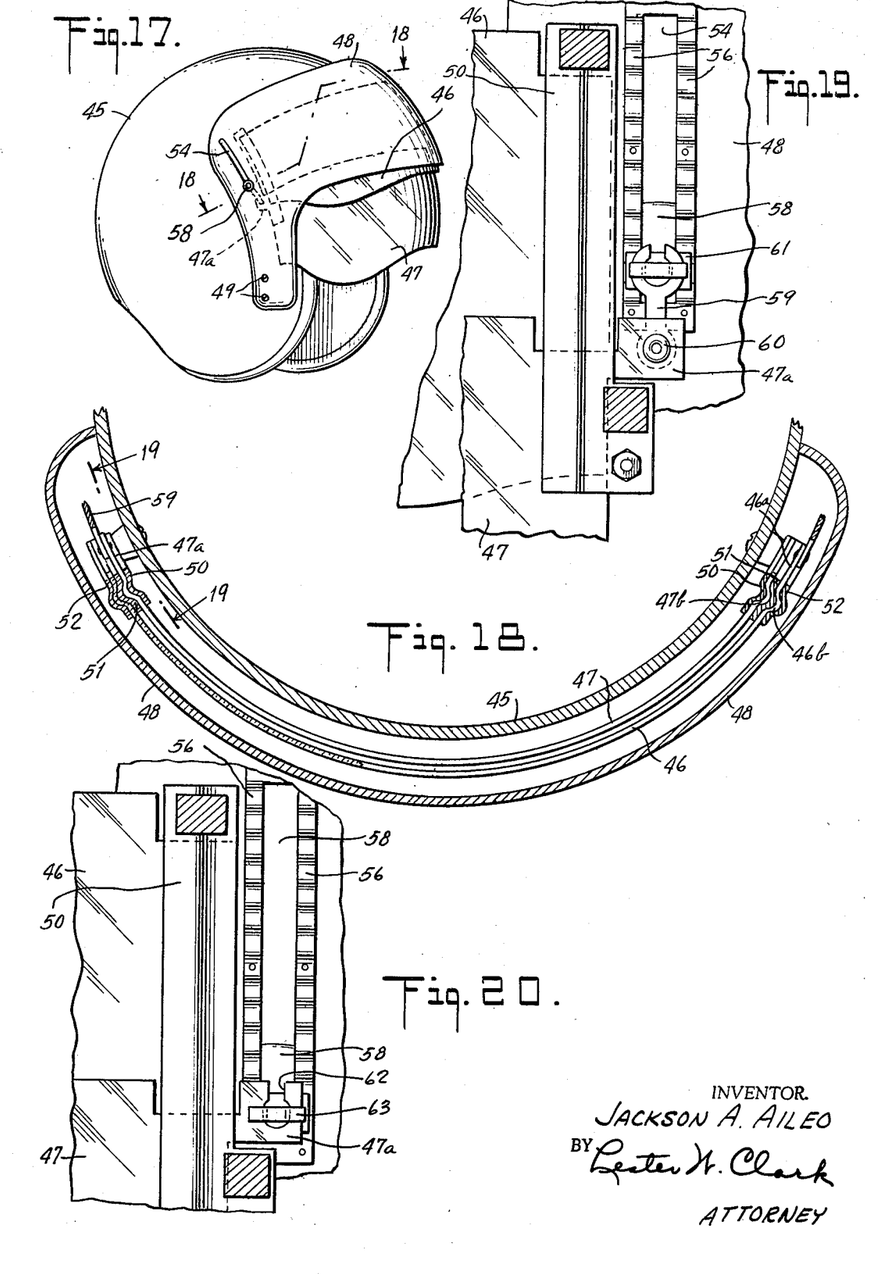
FIG. 17 is a perspective view of a helmet embodying a still further modification of the invention and having two eye shields.
FIG. 18 is a sectional view taken on the line 18—18 of FIG. 17.
FIG. 19 is a view taken on the line 19—19 of FIG. 18.
FIG. 20 is a view similar to FIG. 19 but showing an alternative arrangement for connecting an eye shield to its associated operating mechanism in the embodiment of FIG. 17.

The eye shields 46 and 47 are generally similar in structure and mounting to the shields 30 and 31 of the embodiment shown in FIGS. 14–16, except that the edge portions of shields 46 and 47 conform generally to the curvature of the subject helmet shell to permit these edges and their associated ways to be enclosed within the cover 48. Specifically, each of the shields 46 and 47, as best seen in FIG. 18, is provided along its lateral margins with forwardly projecting ribs 46b and 47b. These ribs fit between correspondingly formed ribs in a stack of strips 50, 51 and 52 in the same manner as the ribs 30b and 31b of shields 30 and 31 in FIGS. 14–16 fit between strips 32, 33 and 34 of the structure there illustrated. The strips are supported in fixed position on the helmet and in spaced relation to each other in the same manner as the aforementioned strips 32, 33 and 34 of FIGS. 14–16, to constitute the ways or tracks in which the eye shields move.

Shield 46 has an integral tab 46a at its upper right-hand corner and shield 47 has an integral tab 47a at its upper left-hand corner. It will be understood that the terms "right" and "left" are used in the same sense as in the description of the immediately preceding embodiment—that is to say, as viewed from the front of the helmet looking toward the wearer. These tabs project, on opposite sides of the helmet, through and beyond the spaces between the strips forming the ways.

At the left-hand side of the eye shield cover 48 adjacent the path of movement of the tab 47a, there is provided a slot 54 extending along the cover 48 in the direction of such path of movement. As best seen in FIG. 19, a pair of corrugated strips 56 (similar to the corrugated strips 16 in the helmet of FIGS. 1–8) are mounted on the under side of the cover 48 on either side of the slot 54. A handle 58, which may be essentially identical in construction to the handle 14 of the helmet of FIGS. 1–8, is positioned for movement along the slot 54 and is connected to the tab 47a of shield 47, inwardly of the slot, by means of a link 59 which is pivotally secured to tab 47a by eyelet 60.

As will be understood, the handle 58 bears a pair of laterally extending teeth 61 (similar to teeth 17a of handle 14 in FIGS. 1–8) positioned for engagement with the corrugated spring 56 and spring biased into such engagement to maintain the shield 47 in any desired position in its path of movement. Handle 58 also has a pushbutton (similar to button 18 of handle 14 in FIGS. 1–8) which may be depressed to overcome the biasing force on teeth 61 so as to facilitate movement of the eye shield 47 by means of the handle.

In other words, movement of the eye shield 47 is effected in the same manner as movement of the eye shield 2 in the helmet of FIGS. 1–8 by the handle 58 moving along slot 54 and engaging corrugated springs 56. An identical arrangement (not shown) for effecting movement of the eye shield 46, including a slot and handle moving along the slot and connected to tab 46a, is provided at the right-hand side of the eye shield cover 48— that is, at the side of the cover opposite to that at which slot 54 is located.

Although in FIG. 19 the handle 58 is shown as connected to the eye shield tab 47a by a pivoted link 59, the handle may alternatively be connected directly to the eye shield tab, as illustrated in FIG. 20. Thus, tab 47a may have an upwardly opening keyhole slot 62 through which the handle 58 projects, the inner teeth 63 of the handle engaging the rearward surface of tab 47a to secure the tab to the handle.

As in the case of the embodiments shown in FIGS. 1–16, the structures of FIGS. 17–20 enable the wearer to move the eye shields without extending his hand or arm in front of his field of vision; and there is no knob or button structure projecting upwardly above the helmet since the eye shield handles are located at the sides of the helmet.

Figure 21:
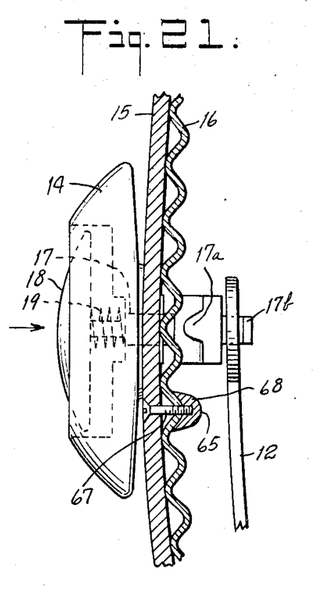
FIG. 21 is an enlarged fragmentary view of a helmet as shown in FIG. 1, taken along the line 5—5 of FIG. 1, showing a form of stop structure mounted in the path of the eye shield operating mechanism.
Figure 22:
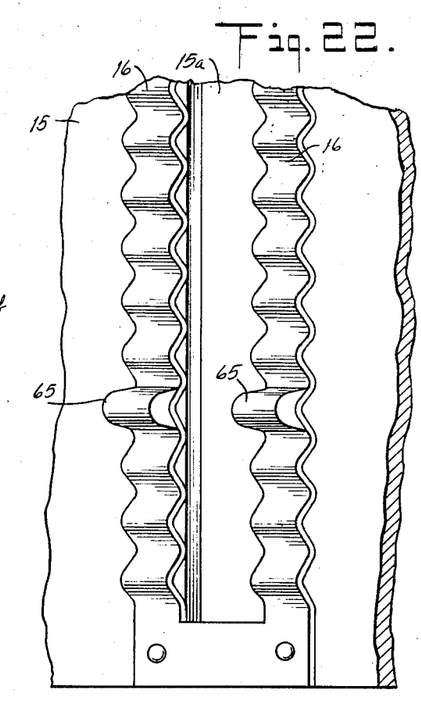
FIG. 22 is a fragmentary perspective view of the stop structure of FIG. 21.
Figure 23:
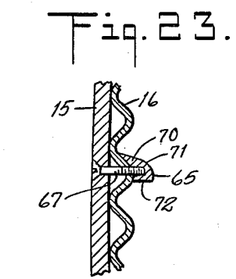
FIG. 23 is a fragmentary sectional view showing a modified form of stop structure.

FIGS. 21–23

These figures illustrate the provision of a form of stop structure in the path of movement of the eye shield handle 14 in the helmet of FIGS. 1–8 for limiting eye shield movement in either a downward or upward direction.

This stop structure comprises a projection 65 fixedly positioned on the corrugated spring 16 and extending above the level of the corrugations of spring 16 so that when the button 18 is depressed sufficiently to release the teeth 17a from camming engagement with the spring and thereby to permit free movement of the handle 14 and the eye shield, the teeth 17a will nevertheless abut projection 65. This interference between teeth 17a and projection 65 prevents movement of the handle and eye shield beyond the locality of the projection unless the button 18 is further depressed, to move the teeth 17a further away from spring 16 against the biasing force of spring 19, the projection 65 being so dimensioned that when the button 18 is fully depressed, the teeth 17a can pass over and beyond projection 65.

The projection may be positioned at any selected locality on spring 16; for example, it may be located adjacent the lower end of the spring in a position corresponding to a shielding position of the eye shield at which the eye shield is in proper and comfortable relation to the individual wearer's nose. In such case, as the wearer moves the eye shield downwardly by ordinary partial depression of button 18, the handle 14 and the eye shield connected thereto advance freely downward until teeth 17a abut projection 65. Downward movement of the eye shield is then arrested at the selected position, but should the wearer desire to advance the eye shield further downward, he simply depresses the button 18 fully, allowing teeth 17a to pass over projection 65.

Alternatively, projection 65 may be positioned immediately above the locality in the path of teeth 17a corresponding to a desired shielding position. The eye shield is brought into shielding position by full depression of button 18, allowing teeth 17a to pass over the projection 65, and button 18 is then released so that spring 19 returns the teeth 17a into camming engagement with the spring 16. Ordinarily, spring 19 is effective to hold the latter teeth in engagement with the corrugated spring against movement of the eye shield in either direction; but it sometimes happens that aerodynamic effects such as wind blast may overcome the force of spring 19 sufficiently to produce upward movement of the eye shield with the teeth 17a undergoing cam motion relative to the normal corrugations of spring 16. However, since projection 65 extends further from housing 15 than the corrugations of spring 16 (in a direction normal to the housing surface), such upward movement is arrested when the teeth 17a approach and abut the projection 65 from below.

In a broad sense, the projection 65 may be provided by any structural element fixedly positioned in spring 16 and extending further than the corrugations of spring 16 from the surface of housing 15 in a direction normal to the housing surface, but sufficiently limited in such extent to permit the teeth 17a of handle 14 to pass over the projection when the button 18 is fully depressed. For example, projection 65 may comprise a simple screw 67 threaded through housing 15 from the exterior thereof and projecting through spring 16. In the form shown in FIGS. 21 and 22, the projection further includes a cam-surfaced nut 68 threaded on the inner end of screw 67 to provide a smooth cam-shaped surface for easing passage of teeth 17a past projection 65 in either direction when the button 18 is substantially fully depressed. As particularly shown in FIG. 22, a pair of projections 65 may be provided, respectively positioned on the two corrugated springs 16 on opposite sides of the housing slot 15a, for simultaneously engaging the two teeth 17a of handle 14.

A somewhat modified form of projection 65 is illustrated in FIG. 23. In the structure of FIG. 23, on the inner end of screw 67 there is threaded a nut 70 having an upper camming surface 71 and a lower flat surface 72 normal to the direction of movement of the teeth 17a. The upper camming surface 71 of this projection facilitates downward movement of the teeth 17a thereover, while the flat lower surface 72 affords especially effective prevention of accidental upward movement of the handle and eye shield. That is to say, if the teeth 17a are carried upward into engagement with surface 72 (as, for example, owing to wind blast acting on the eye shield), they are positively arrested by such engagement and cannot move by camming action over and beyond the projection.

While the illustrated stop means has been particularly shown and described as incorprated in the helmet structure of FIGS. 1–8, it will be appreciated that such means may be used in other helmet structures having an eye shield handle with a tooth portion normally spring biased into engagement with a corrugated spring or track and further having a push button on the handle for overcoming the bias force to release the handle from the track, such push button being depressible to enable the handle to override the stop. Thus, for example, the stop means shown may be used in the structure described in the aforementioned copending application of Jackson A. Aileo, Ser. No. 560,575.

Figure 24:
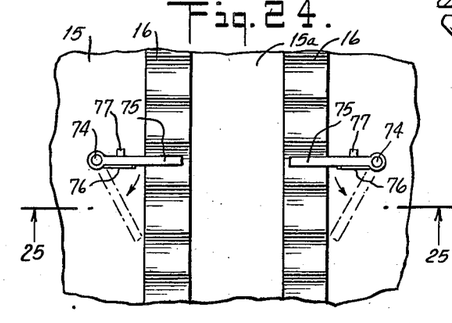
FIG. 24 is an enlarged fragmentary view taken along the line 6—6 of FIG. 5 and showing a further alternative embodiment of the stop structure of the invention.
Figure 25:
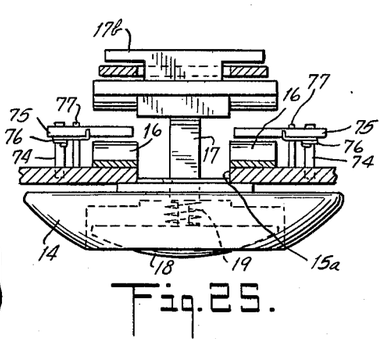
FIG. 25 is a view taken on the line 25—25 of FIG. 24 showing the relation of the eye shield operating mechanism to the stop structure of FIG. 24.

FIGS. 24–25

A modified form of stop structure for arresting eye shield motion only in an upward direction is illustrated in these figures, again as incorporated in the helmet structure of FIGS. 1–8. In this arrangement, a pair of inwardly projecting pivot pins 74 are mounted in the housing 15 respectively adjacent to the two corrugated springs 16, at the locality in the path of movement of handle 14 at which it is desired to provide a stop. On each of these pins 74, there is pivoted a finger 75 extending transversely across (and inwardly of) the adjacent corrugated spring 16. Also mounted on each pin 74 is a small torsion spring 76 which bears against the finger 75 and urges it upwardly. In addition, adjacent each pin 74 there is disposed a stop pin 77 positioned to engage the upper surface of finger 75 so as to arrest upward rotation thereof under the force of torsion spring 76 in a position at which the finger extends laterally across the adjacent corrugated spring 16. Torsion springs 76 and stop pins 77 thus cooperate to hold the fingers 75 in the latter position.

When the handle 14 is moved downwardly along slot 15a from a locality above pins 74 and fingers 75, the teeth 17a of the handle engage the fingers 75 and swing them downwardly (as indicated by the small arrows in FIG. 24) against the force of torsion springs 76, moving the fingers out of the path of the handle so as to permit the handle and the eye shield to be moved freely downward beyond the stop locality.

However, when the handle is below the stop locality, the fingers are restored to their initial laterally extending position by springs 76. Should the eye shield and handle thereafter be moved upwardly (as by wind blast effect acting on the eye shield and causing the teeth 17a of the handle to move by camming action relative to the corrugated springs 16), the fingers 75 engage the handle structure and prevent upward movement thereof beyond the stop locality. Specifically, when the upwardly moving teeth 17a abut the lower edges of the fingers 75, they are arrested and held by the fingers against further upward movement, since the stop pins 77 prevent rotation of the fingers out of the path of teeth 17a in an upward direction. To enable the handle to override fingers 75, the button 18 must be depressed to move the teeth inwardly against the force of biasing spring 19 (as shown in FIG. 25) for a distance greater than the elevation of fingers 75 above the corrugated springs 16; when this is done, the handle can be moved upwardly past the stop locality.

As in the case of the structures of FIGS. 21–23, the stop arrangement of FIGS. 24–25 may also be employed in other helmet structures such as that described in the aforementioned copending Aileo application Ser. No. 560,575.

FIGS. 26–29

These figures show a modified form of eye shield handle and associated detent means suitable for use in place of the handle 14 in the structure of FIGS. 1–8.

Figure 26:
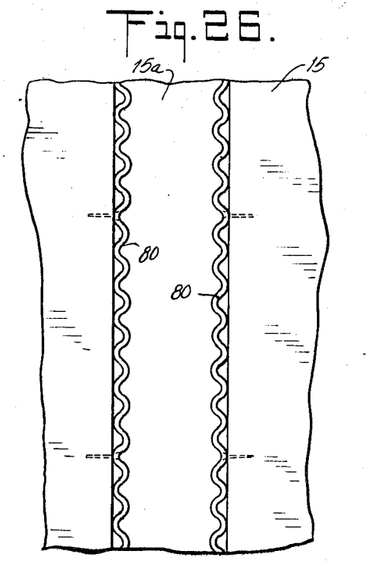
FIG. 26 is an enlarged fragmentary view of the housing for the eye shield operating mechanism of a helmet as shown in FIG. 1, illustrating a modified form of detent structure for an eye shield operating mechanism.

The detent elements of this modification comprise a pair of corrugated springs 80, similar in form to the springs 16 of FIGS. 1–8 but mounted along the opposed side edges of the housing slot 15a in facing relation to each other, as best shown in FIG. 26. The handle comprises a pair of rigid disc bodies 81 and 82 respectively disposed on the outer and inner surfaces of housing 15 and interconnected by means of a spacer element 84 and a central shaft 85 both extending through slot 15a. Discs 81 and 82 are dimensioned to prevent the handle from slipping inwardly or outwardly relative to the slot. The link 12, connected to eye shield 2 (which is not shown in FIGS. 26–29) is connected to the inner end of shaft 85 for movement therewith.

A pair of dogs 87 are pivotally mounted on shaft 85 for angular movement about the shaft axis. Each of these dogs bears a projection 88 extending transversely of shaft 85 into engagement with one of the corrugated springs 80. Each projection 88 bears an L-shaped finger member 89 extending outwardly and downwardly from the projection externally of housing 15 in position to be grasped by the fingers of the wearer.

A torsion spring 90 is also mounted on shaft 85 and has a pair of legs 91 respectively engaging the finger members 89 of the two dogs 87 so as to urge the projections 88 of these dogs respectively into engagement with the two opposed corrugated springs 80. Such engagement holds the handle and the eye shield connected thereto fixed in any selected position in the path of handle and eye shield movement.

Figure 27:
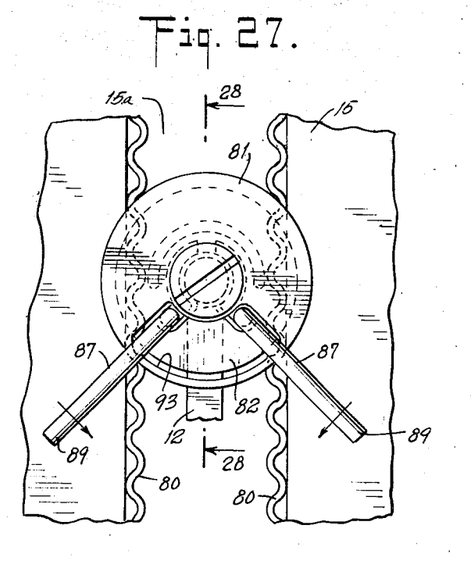
FIG. 27 is a view similar to FIG. 26 showing an eye shield operating mechanism adapted for use with the detent structure of FIG. 26.
Figure 28:
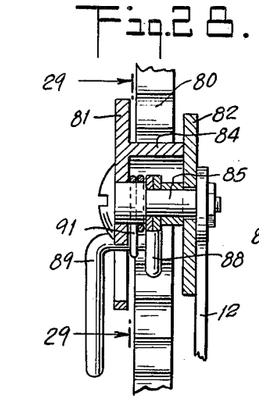
FIG. 28 is a section view taken on the line 28—28 of FIG. 27.
Figure 29:
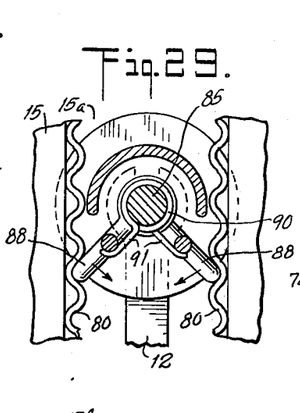
FIG. 29 is a sectional view taken on the line 29—29 of FIG. 28.

As best seen in FIG. 27, under this biasing force of spring 90 the finger members 89 of the two dogs extend downwardly from shaft 85 in diverging relation to each other. To release the handle and eye shield for movement, the two members 89 are grasped by the fingers of the wearer and pressed or pinched together against the force of spring 90 (an aperture 93 being provided in the outer disc 81 to accommodate such motion of the dogs), releasing the projections 88 from engagement with the springs 80. After the handle and eye shield have been moved to the desired new position, members 89 are released and the projections 88 are then returned by spring 90 again into engagement with the corrugated springs 80 to hold the eye shield in this new position.

If desired, stops similar to those shown in FIGS. 21–23 may be provided in the structure of FIGS. 26–29, to arrest downward and/or upward movement of the handle and eye shield at a selected locality. Such stops may comprise projections fixedly mounted in opposed relation to each other on the two corrugated springs 80 extending above the level of the corrugations to engage and arrest the projections 88 but sufficient limited in such extent to permit projections 88 to override and pass the stops upon full compression of the finger members 89.

The handle structure of FIGS. 26–29 may also be employed in helmets wherein the eye shield handle is connected directly to the shield, for example replacing the push button handle shown in the Aileo application Ser. No. 560,575, and in such case the shaft 85 is directly connected to the eye shield. Since the eye shield itself then prevents outward movement of the handle relative to the slot in which the handle rides, the inner disc of the handle may be omitted when the handle is directly connected to an eye shield.

Figure 30:
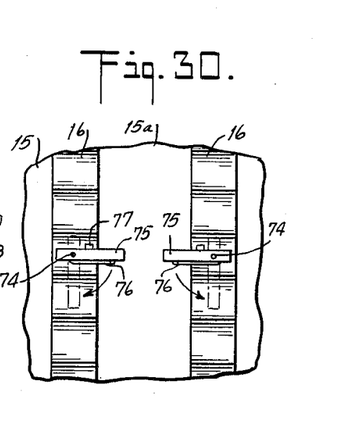
FIG. 30 is a view similar to FIG. 24 but showing a further modified form of stop structure.
Figure 31:
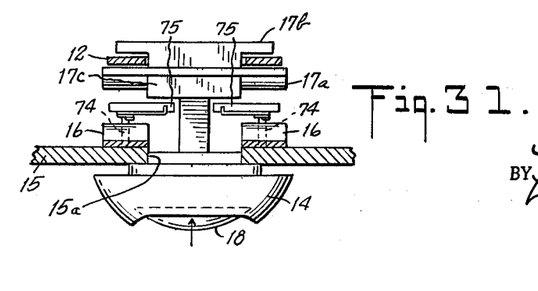
FIG. 31 is a view similar to FIG. 25 showing the relation of the eye shield operating mechanism to the stop structure of FIG. 30.

FIGS. 30–31

These fingers show a stop structure similar to that of FIGS. 24–25, again incorporated in the helmet of FIGS. 1–8 and including a pair of pivot pins 74 extending inwardly from the housing 15, with transverse fingers 75 pivoted thereon above the level of the corrugations of springs 16, the fingers 75 being biased by torsion springs 76 into engagement with stop pins 77 so as normally to extend laterally of the corrugated springs 16.

The stop means of FIGS. 30–31 differs from the structure of FIGS. 24–25 in that, in FIGS. 30–31 the pivot pins 74 are mounted in rather than alongside of the corrugated springs 16, and the fingers 75 extend across the slot 15a. These fingers are thus arranged to engage the central rectangular portion 17c of post 17 which is ordinarily received in the slot 15a between the two corrugated springs 16. Upon downward movement of the handle 14 from a position above the stop locality, the fingers 75 swing downwardly (as indicated in FIG. 30) against the biasing force of springs 76 to permit passage of the handle portion 17c, and are then restored to their initial position by the springs 76; but upon upward movement of the handle from a position below the stop locality, the fingers 75 engage handle portion 17c and arrest such upward movement (being held against upward rotation by stop pins 77) unless the pushbutton 18 is fully depressed, as shown in FIG. 31, to move the portion 17c inwardly beyond the fingers 75.

While I have shown and described certain preferred embodiments of my invention, it will be readily recognized by those skilled in the art that other modifications thereof may be made.

I claim:
1. A safety helmet including:
 (a) a shell adapted to receive the head of a wearer;
 (b) an eye shield;
 (c) guide means fixed on the shell and receiving the edges of the eye shield for sliding movement thereof between an eye shielding position in front of the wearer's eyes and a retracted position above the front part of the shell;
 (d) housing structure affixed to the shell and providing an elongated slot disposed at a side of the shell and spaced from the shell surface;
wherein the improvement comprises:
 (e) a handle for manual actuation of the eye shield between its positions, said handle being located at the side of the shell and connected to the eye shield so that the eye shield may be manipulated by the wearer without extending his hand or arm into his field of vision, said handle being mounted in said housing structure and slidable along said slot;

(f) a corrugated track mounted on said housing structure and extending along said slot;

(g) tooth means movably mounted on said handle for engaging the corrugations of said track to lock said eye shield in any of a plurality of positions along its path of travel;

(h) spring means carried by said handle for biasing said tooth means into engagement with said track;

(i) manually operable means on said handle for overcoming the force of said spring means to disengage said tooth means from said track and thereby to release said eye shield from any of said plurality of positions;

(j) a stop element mounted on said housing structure adjacent said slot and projecting above said track for engaging a portion of said handle at a preselected locality along said slot to arrest movement of said handle along said slot in at least one direction at said preselected locality;

(k) said handle portion being movable relative to the handle into and away from position engaging said stop element, and being biased by said spring means into stop-engaging position; and (l) said manually operable means being operable to displace said handle portion away from the stop-engaging position to enable movement of said handle in said one direction through and beyond said predetermined locality.

2. A safety helmet as defined in claim 1, wherein the improvement further comprises said stop element being a fixed projection mounted on said track for engaging said tooth means to arrest movement of said handle in either direction along said slot.

3. A safety helmet as defined in claim 1, wherein the improvement further comprises:

(a) said stop element being pivotally mounted so as to be rotatable out of the path of said handles upon engagement with said handle portion as said handle is advanced in a first direction along said slot;

(b) a stop pin mounted on said housing structure for engaging said stop element to prevent rotation of said stop element out of the path of said handle upon engagement with said handle portion as said handle is advanced in a second direction along said slot; and (c) biasing means engaging said stop element for biasing said element into engagement with said stop pin.

4. A safety helmet as defined in claim 1, wherein the improvement further comprises:

(a) said corrugated track extending along one side edge of said slot;

(b) said stop element including a second corrugated track extending in facing relation to the first-mentioned corrugated track along an opposed edge of said slot;

(c) said tooth means including a first dog pivotally mounted on said handle within said slot and movable into engagement with said first corrugated track;

(d) said handle portion including a second dog pivotally mounted on said handle within said slot and movable into engagement with said second corrugated track;

(e) said spring means engaging said first and second dogs to bias said dogs into engagement with said first and second tracks respectively; and (f) said manually operable means including projections connected to said first and second dogs and positioned to be grasped simultaneously by the wearer's fingers for simultaneous movement of the dogs against the force of said spring means away from said corrugated tracks.

5. A safety helmet, including:

(a) a shell adapted to receive the head of a wearer;

(b) an eye shield;

(c) guide means fixed on the shell and receiving the edges of the eye shield for sliding movement thereof between an eye shielding position in front of the wearer's eyes and a retracted position above the front part of the shell;

(d) a handle connected to the eye shield for manual actuation of the eye shield between its position;

(e) housing structure affixed to the shell and providing an elongated slot spaced from the shell surface;

(f) said handle being mounted on said housing structure and slidable along said slot;

(g) a corrugated track mounted on said housing structure and extending along said slot;

(h) tooth means movably mounted on said handle for engaging the corrugations of the track to lock said eye shield in any of a plurality of positions along its path of travel;

(i) spring means carried by said handle for biasing said tooth means into engagement with said track; and (j) manually operable means on said handle for overcoming the force of said spring means to disengage said tooth means from said track thereby to release said eye shield from any of said plurality of positions;

wherein the improvement comprises:

(k) a stop element mounted on said housing structure adjacent said slot and projecting above said track for engaging a portion of said handle at a preselected locality along said slot to arrest movement of the handle along the slot in at least one direction at said predetermined locality;

(l) said handle portion being movable relative to said handle into and away from position engaging said stop element and being biased by said spring means into stop-engaging position; and (m) said manually operable means being operable to displace said handle portion away from stop-engaging position to enable movement of said handle through and beyond said predetermined locality in said one direction.

6. A safety helmet as defined in claim 5, wherein the improvement further comprises said stop element being a fixed projection mounted on said track for engaging said tooth means to arrest movement of said handle in either direction along said slot.

7. A safety helmet as defined in claim 6, wherein the improvement further comprises said stop element having a cam surface extending in both directions from said projection along the path of movement of said handle in said slot.

8. A safety helmet as defined in claim 6, wherein the improvement further comprises said stop element having a cam surface extending from said projection in one direction along the path of movement of said handle in said slot, and having a substantially flat surface facing away from said cam surface and extending from said projection to said track in a plane normal to said path of movement.

9. A safety helmet as defined in claim 5, wherein the improvement further comprises:

(a) said stop element being pivotally mounted so as to be rotatable out of the path of said handles upon engagement with said handle portion as said handle is advanced in a first direction along said slot;

(b) a stop pin mounted on said housing structure for engaging said stop element to prevent rotation of said stop element out of the path of said handle upon engagement with said handle portion as said handle is advanced in a second direction along said slot; and (c) biasing means engaging said stop element for biasing said element into engagement with said stop pin.

10. A safety helmet as defined in claim 5, including:
(a) a pair of corrugated tracks respectively extending along opposite sides of said slot;
(b) said tooth means including a pair of teeth, movable together relative to said handle, and respectively engageable with said pair of tracks;
wherein the improvement further comprises:
(c) said stop element being mounted adjacent one side of said slot and projecting above one of said tracks; and
(d) a second stop element mounted on the other side of said slot and projecting above the other of said tracks at said preselected locality.

11. A safety helmet as defined in claim 5, wherein the improvement further comprises:
(a) said corrugated track extending along one side edge of said slot;
(b) said stop element including a second corrugated track extending in facing relation to the first-mentioned corrugated track along an opposed side of said slot;
(c) said tooth means including a first dog pivotally mounted on said handle within said slot and movable into engagement with said first corrugated track;
(d) said handle portion including a second dog pivotally mounted on said handle within said slot and movable into engagement with said second corrugated track;
(e) said spring means engaging said first and second dogs to bias said dogs into engagement with said first and second tracks respectively; and
(f) said manually operable means including projections connected to said first and second dogs and positioned to be grasped simultaneously by the wearer's fingers for simultaneous movement of the dogs against the force of said spring means away from said corrugated tracks.

References Cited

UNITED STATES PATENTS

| | | | |
|---|---|---|---|
| 1,416,848 | 5/1922 | Lightfield | 2—10 XR |
| 1,683,170 | 9/1928 | Di Carlo. | |
| 2,590,526 | 3/1952 | Evans | 2—8 |
| 2,798,221 | 7/1957 | Bailey et al. | 2—6 |
| 2,813,271 | 11/1957 | Finken | 2—6 |
| 3,110,034 | 11/1963 | Aileo | 2—6 |
| 3,239,843 | 3/1966 | Lobelle | 2—6 |
| 2,445,355 | 7/1948 | Hurt | 2—10 |
| 3,315,272 | 4/1967 | Olt et al. | 2—6 XR |
| 3,368,220 | 2/1968 | Wenzel | 2—8 |

JAMES R. BOLER, Primary Examiner